(12) United States Patent
Xie et al.

(10) Patent No.: US 9,312,763 B2
(45) Date of Patent: Apr. 12, 2016

(54) DC-DC CONVERTER

(71) Applicant: Huawei Technologies Co., Ltd., Shenzhen, Guangdong (CN)

(72) Inventors: Qiang Xie, Shenzhen (CN); Liang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 14/257,627

(22) Filed: Apr. 21, 2014

(65) Prior Publication Data

US 2014/0312862 A1    Oct. 23, 2014

(30) Foreign Application Priority Data

Apr. 22, 2013   (CN) .......................... 2013 1 0140249

(51) Int. Cl.
| | | |
|---|---|---|
| *G05F 1/40* | (2006.01) | |
| *H02M 3/156* | (2006.01) | |
| *H02M 1/00* | (2007.01) | |

(52) U.S. Cl.
CPC ...... *H02M 3/156* (2013.01); *H02M 2001/0025* (2013.01)

(58) Field of Classification Search
CPC ................... H02M 3/1584; H02M 2001/0025; H02M 3/3353; H02M 3/1563; H02M 3/1588
USPC ........ 323/222, 224, 266, 271; 363/19, 89, 98, 363/132
See application file for complete search history.

(56) References Cited

U.S. PATENT DOCUMENTS

| | | | | |
|---|---|---|---|---|
| 7,042,203 B2* | 5/2006 | Van Der Horn | ....... | H02M 3/156 323/225 |
| 7,091,711 B2* | 8/2006 | Yoshida | .............. | H02M 3/1563 323/282 |
| 7,109,693 B2* | 9/2006 | Yoshida | .............. | H02M 3/1563 323/282 |
| 7,457,140 B2* | 11/2008 | Klein | .................... | H02M 3/158 323/225 |
| 7,482,791 B2* | 1/2009 | Stoichita | ............... | H02M 3/156 323/271 |
| 7,719,247 B2* | 5/2010 | Lipcsei | ................. | H02M 1/143 323/224 |
| 8,907,644 B2* | 12/2014 | Menegoli | .............. | H02M 3/158 323/271 |
| 2004/0070382 A1 | 4/2004 | Walters et al. | | |
| 2010/0253309 A1 | 10/2010 | Xi et al. | | |
| 2012/0025793 A1 | 2/2012 | Tai et al. | | |
| 2013/0257399 A1 | 10/2013 | Jiang et al. | | |

FOREIGN PATENT DOCUMENTS

| | | |
|---|---|---|
| CN | 1308407 A | 8/2001 |
| CN | 1603996 A | 4/2005 |
| CN | 101093958 A | 12/2007 |
| CN | 101227147 A | 7/2008 |
| CN | 101964587 A | 2/2011 |
| CN | 102611306 A | 7/2012 |

* cited by examiner

*Primary Examiner* — Rajnikant Patel
(74) *Attorney, Agent, or Firm* — Leydig, Voit & Mayer, Ltd.

(57) ABSTRACT

The present invention is applicable to the field of direct current conversion, and provides a DC-DC converter. In the present invention, a DC-DC converter including a triangular wave generation module and a switch control module is adopted. The triangular wave generation module generates a triangular wave signal according to voltages at both ends of an energy storage inductor L1, and the switch control module outputs a control level according to its internally generated clock signal and the triangular wave signal to control a switching operation of a PMOS power tube and an NMOS power tube according to a preset switching frequency.

5 Claims, 5 Drawing Sheets

US 9,312,763 B2

DC-DC CONVERTER

CROSS-REFERENCE TO RELATED APPLICATION

This application claims priority to Chinese Patent Application No. 201310140249.8, filed on Apr. 22, 2013, which is hereby incorporated by reference in its entirety.

TECHNICAL FIELD

The present invention relates to the field of direct current conversion, and in particular, to a DC-DC converter.

BACKGROUND

At present, for a DC-DC converter, a conversion mode includes a boost type, a buck type, and a buck-boost type, and an operational mode also includes a peak current mode, a valley current mode, and a voltage mode, which have a fixed frequency, and also includes a hysteresis mode which has a non-fixed switching frequency. As a load has increasingly high requirements on frequency components, a fixed switching frequency is essential, and is also critical. Therefore, a current-type DC-DC converter and a voltage-type DC-DC converter that have a fixed switching frequency are provided in the prior art. The current-type DC-DC converter has a buck type structure which works in a peak current mode. The current-type DC-DC converter controls on and off of a power tube through a current sampling circuit, a slope compensation circuit, and an error amplifier. Although the objective of implementing fixed switching frequency can be achieved, the current-type DC-DC converter has a relatively complex circuit structure, high cost, and undesirable anti-noise capability. The voltage-type DC-DC converter controls on and off of a PMOS power tube and an NMOS power tube by using an output level of a comparator, while the output of the comparator is determined by both a sawtooth wave with a fixed frequency and a level signal that is output by an error amplifier after error comparison and amplification of an output feedback voltage; however, because the error amplifier is used, large capacitance and large resistance are required to perform third-order compensation on an output direct current, so that the DC-DC converter has a complex structure and a large occupied packaging area in circuit integration, which increases the cost.

To sum up, an existing DC-DC converter can implement fixed switching frequency control of a power tube, but has undesirable anti-noise capability caused by a complex circuit structure, and has an excessively large occupied packaging area in a chip and increased cost in circuit integration.

SUMMARY

An objective of the present invention is to provide a DC-DC converter to solve the problems that an existing DC-DC converter can implement fixed switching frequency control of a power tube, but has undesirable anti-noise capability caused by a complex circuit structure, and has an excessively large occupied packaging area in a chip and increased cost in circuit integration.

The present invention is implemented as follows: A DC-DC converter is connected to a direct current power supply, and includes a PMOS power tube, an NMOS power tube, an energy storage inductor L1, and a filter capacitor C1, where the PMOS power tube and the NMOS power tube perform a switching operation respectively according to a frequency of an input signal on a respective gate to perform voltage conversion on a direct current output by the direct current power supply, and the energy storage inductor L1 and the filter capacitor C1 perform voltage stabilization and filter processing on the direct current after the voltage conversion performed by the PMOS power tube and the NMOS power tube, and output the direct current, and the DC-DC converter further includes:

a triangular wave generation module, including a first input terminal and a second input terminal connected to a first end and a second end of the energy storage inductor L1, respectively, and configured to generate a triangular wave signal according to voltages at both ends of the energy storage inductor L1; and a switch control module, including an input terminal connected to an output terminal of the triangular wave generation module and an output terminal connected to both the gates of the PMOS power tube and the NMOS power tube, and configured to output a control level according to the triangular wave signal to control a switching operation of the PMOS power tube and the NMOS power tube according to a preset switching frequency.

In the present invention, the DC-DC converter including the triangular wave generation module and the switch control module is adopted. The triangular wave generation module generates a triangular wave signal according to voltages at both ends of the energy storage inductor L1, and the switch control module outputs a control level according to its internally generated clock signal and the triangular wave signal to control a switching operation of the PMOS power tube and the NMOS power tube according to a fixed switching frequency, so as to implement preset switching frequency control of the PMOS power tube and the NMOS power tube, simplify the circuit structure of the DC-DC converter while ensuring voltage conversion of a direct current, improve anti-noise capability, reduce an occupied packaging area of the DC-DC converter in an integrated design of a chip, and further reduce the cost of a chip, thereby solving the problem that an existing DC-DC converter can implement fixed switching frequency control of a power tube, but has undesirable anti-noise capability caused by a complex circuit structure, and has an excessively large occupied packaging area in a chip and increased cost in circuit integration.

DESCRIPTION OF EMBODIMENTS

To make the objective, technical solutions, and advantages of the present invention more comprehensible, the present invention is hereinafter further described in detail with reference to the accompanying drawings and embodiments. It should be understood that, specific embodiments described herein are only used to explain the present invention, rather than limiting the present invention.

In the embodiments of the present invention, a DC-DC converter including a triangular wave generation module and a switch control module is adopted. The triangular wave generation module generates a triangular wave signal according to voltages at both ends of an energy storage inductor L1, and the switch control module outputs a control level according to its internally generated clock signal and the triangular wave signal to control a switching operation of a PMOS power tube and an NMOS power tube according to a fixed switching frequency, so as to implement preset switching frequency control of the PMOS power tube and the NMOS power tube, simplify the circuit structure of the DC-DC converter while ensuring voltage conversion of a direct current, improve anti-noise capability, reduce an occupied packaging area of the DC-DC converter in an integrated design of a chip, and further reduce the cost of a chip.

Figure 1:
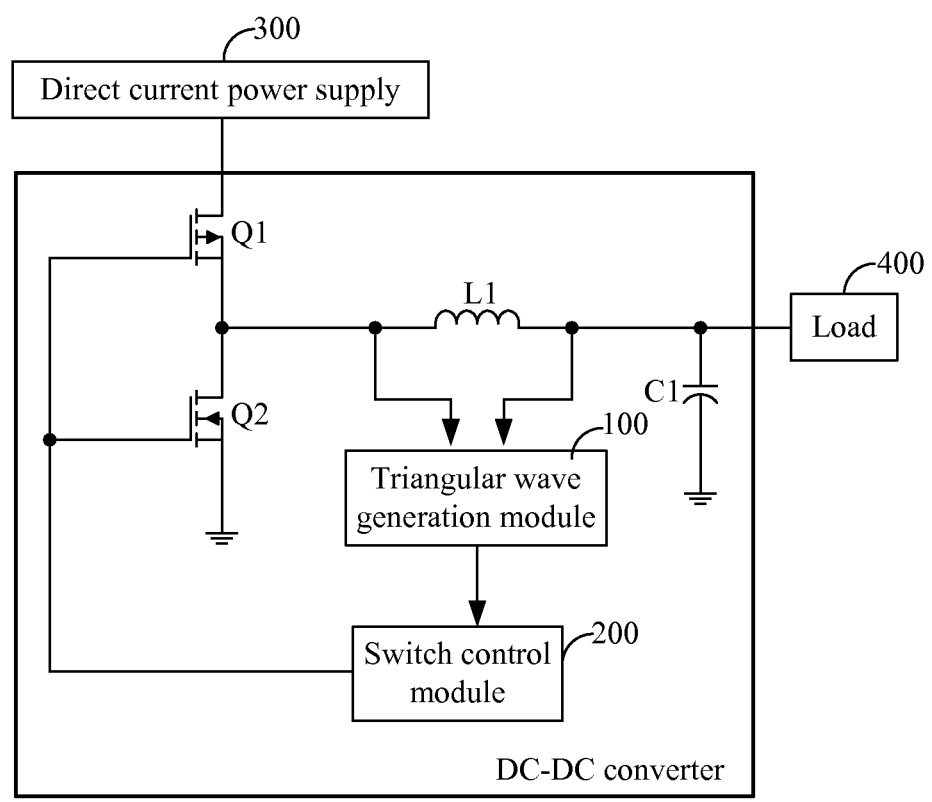
FIG. 1 is a structural diagram of a DC-DC converter provided by an embodiment of the present invention.

FIG. 1 shows a structure of a DC-DC converter provided by an embodiment of the present invention, and for ease of description, only the parts related to the embodiment of the present invention are shown, and described below in detail:

A DC-DC converter is connected to a direct current power supply 300, and includes a PMOS power tube Q1, an NMOS power tube Q2, an energy storage inductor L1, and a filter capacitor C1, where the PMOS power tube Q1 and the NMOS power tube Q2 perform a switching operation respectively according to a frequency of an input signal on a respective gate to perform voltage conversion on a direct current output by the direct current power supply 300, and the energy storage inductor L1 and the filter capacitor C1 constitute a voltage stabilization and filter circuit to perform voltage stabilization and filter processing on the direct current after the voltage conversion performed by the PMOS power tube Q1 and the NMOS power tube Q2, and output the direct current.

The DC-DC converter further includes:

a triangular wave generation module 100, including a first input terminal and a second input terminal connected to a first end and a second end of the energy storage inductor L1, respectively, and configured to generate a triangular wave signal according to voltages at both ends of the energy storage inductor L1; and a switch control module 200, where an input terminal of the switch control module 200 is connected to an output terminal of the triangular wave generation module 100, an output terminal of the switch control module 200 is connected to both the gates of the PMOS power tube Q1 and the NMOS power tube Q2, the switch control module 200 outputs a control level to the gates of the PMOS power tube Q1 and the NMOS power tube Q2 according to the triangular wave signal output by the triangular wave generation module 100, and the control level is used to control a switching operation of the PMOS power tube Q1 and the NMOS power tube Q2 according to a preset switching frequency.

In the embodiment of the present invention, an output terminal of the direct current power supply 300 is connected to a drain of the PMOS power tube Q1, a drain of the NMOS power tube Q2 and a source of the PMOS power tube Q1 are jointly connected to the first end of the energy storage inductor L1, a source of the NMOS power tube Q2 is grounded, a positive electrode and a negative electrode of the filter capacitor C1 are connected to the second end of the energy storage inductor L1 and grounded, respectively, and the second end of the energy storage inductor L1 is connected to a load 400.

Figure 2:
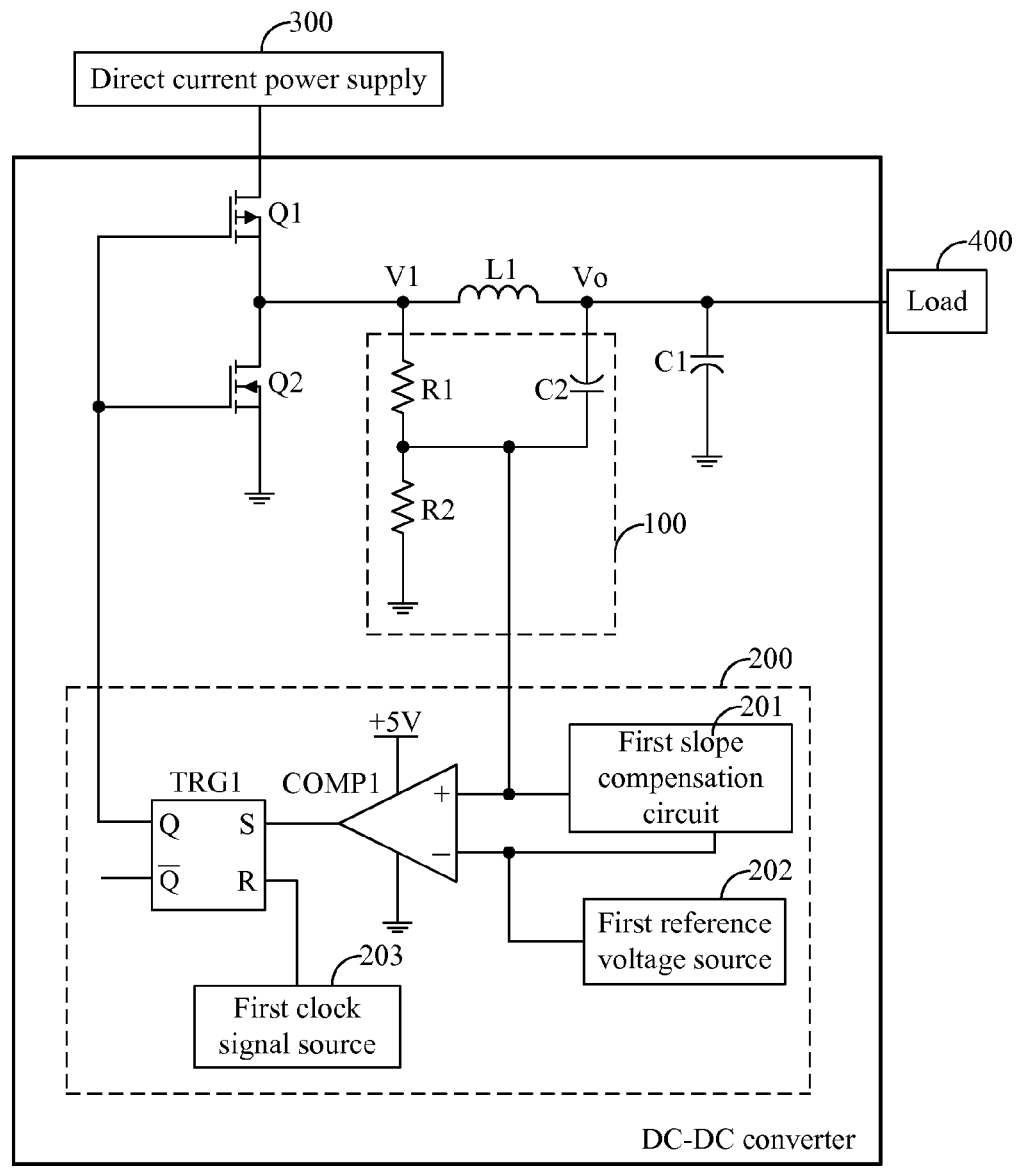
FIG. 2 shows an exemplary circuit structure of a DC-DC converter provided by a first embodiment of the present invention.

The specific implementation of the DC-DC converter is described below in detail with reference to specific embodiments First Embodiment FIG. 2 shows an exemplary circuit structure of a DC-DC converter provided by the first embodiment of the present invention, and for ease of description, only the parts related to the first embodiment of the present invention are shown, and described below in detail:

As an embodiment of the present invention, a triangular wave generation module 100 includes a resistor R1, a resistor R2, and an energy storage capacitor C2, where a first end of the resistor R1 is connected to a first input terminal of the triangular wave generation module 100, a second end of the resistor R1 and a first end of the resistor R2 are jointly connected to a positive electrode of the energy storage capacitor C2, a second end of the resistor R2 is grounded, and the positive electrode and a negative electrode of the energy storage capacitor C2 are connected to an output terminal and a second input terminal of the triangular wave generation module 100, respectively.

As an embodiment of the present invention, a switch control module 200 includes:

a first comparator COMP1, a first RS trigger TRG1, a first slope compensation circuit 201, a first reference voltage source 202, and a first clock signal source 203.

A non-inverting input terminal of the first comparator COMP1 is connected to an input terminal of the switch control module 200, a positive power supply terminal and a negative power supply terminal of the first comparator COMP1 are connected to a +5 V direct current power supply and grounded, respectively, an input terminal of the first slope compensation circuit 201 is connected to the non-inverting input terminal of the first comparator COMP1, an output terminal of the first slope compensation circuit 201 and an output terminal of the first reference voltage source 202 are jointly connected to an inverting input terminal of the first comparator COMP1, a first input terminal S and a second input terminal R of the first RS trigger TRG1 are connected to an output terminal of the first comparator COMP1 and an output terminal of the first clock signal source 203, respectively, a first output terminal Q of the first RS trigger TRG1 is connected to an output terminal of the switch control module 200, and a second output terminal $\overline{Q}$ of the first RS trigger TRG1 is floating. The first slope compensation circuit 201 is a common slope compensation signal generation circuit, and the slope value of a slope compensation signal generated by the first slope compensation circuit 201 changes with that of a falling edge of a triangular wave signal generated by the triangular wave generation module 100; the first reference voltage source 202 is a common reference voltage generation circuit, and is configured to output a reference voltage signal with a fixed voltage value; and the first clock signal source 203 is a common clock signal generation circuit, and is configured to output a clock signal with a fixed frequency. Herein, the first slope compensation circuit 201 is used to generate a slope compensation signal for overcoming the problem that the signal output of the first comparator COMP1 is affected by subharmonic oscillation, so as to improve the working stability of the first comparator COMP1, and ensure accurate on and off control of the PMOS power tube Q1 and the NMOS power tube Q2 by the first RS trigger TRG1.

The DC-DC converter is further described with reference to its working principle:

When working, the resistor R1 and the resistor R2 divide the voltage of the first end of the energy storage inductor L1, and then output the voltage to the positive electrode of the energy storage capacitor C2, while the negative electrode of the energy storage capacitor C2 also obtains a voltage from the second end of the energy storage inductor L1; a triangular wave generation circuit formed of the resistor R1, the resistor R2, and the energy storage capacitor C2 generates a triangular wave signal according to the voltage V1 of the first end and the voltage Vo of the second end of the energy storage inductor L1, and outputs the triangular wave signal to the first comparator COMP1 and the first slope compensation circuit 201; then the first slope compensation circuit 201 outputs a slope compensation signal according to its internally preset natural frequency and the triangular wave signal; the slope compensation signal is superposed with a reference voltage signal output by the first reference voltage source 202 and enters the inverting input terminal of the first comparator COMP1; and the first comparator COMP1 compares the voltage of its non-inverting input terminal with the voltage of its inverting input terminal, and outputs a level signal to the first input terminal S of the first RS trigger TRG1 accordingly. As the voltage of the non-inverting input terminal of the first comparator COMP1 changes with the triangular wave signal, the signals output by the first comparator COMP1 continuously are also pulse signals formed by a combination of high and low levels according to a duty ratio. According to the characteristics of the RS trigger, its logical truth table is as follows:

| R | S | $Q_n$ | $Q_{n+1}$ | $Q'_n$ | $Q'_{n+1}$ |
|---|---|---|---|---|---|
| 0 | 0 | 0 | 0 | 1 | 1 |
| 0 | 0 | 1 | 1 | 0 | 0 |
| 1 | 0 | 0 | 0 | 1 | 1 |
| 1 | 0 | 1 | 0 | 0 | 1 |
| 0 | 1 | 0 | 1 | 1 | 0 |
| 0 | 1 | 1 | 1 | 0 | 0 |
| 1 | 1 | 0 | — | 1 | — |
| 1 | 1 | 1 | — | 0 | — |

In the table, according to the characteristics of the RS trigger, the first input terminal S and the second input terminal R of the first RS trigger TRG1 cannot be set to 1 at the same time; otherwise, output uncertainties of the first RS trigger TRG1 occur. The slope compensation signal determines the signal frequencies of the non-inverting input terminal and the inverting input terminal of the first comparator COMP1, and therefore determines the output frequency of the first comparator COMP1. Therefore, in the embodiment of the present invention, in order that the first clock signal source 203 and the first comparator COMP1 do not simultaneously output high levels within the same pulse width time, the frequency of the clock signal output by the first clock signal source 203 is different from that of the slope compensation signal. When the first comparator COMP1 outputs a high level (that is, the first input terminal S of the first RS trigger TRG1 is set to 1), no matter whether the first clock signal source 203 outputs a high level or low level clock signal (that is, a setting signal of the second input terminal R of the first RS trigger TRG1), the first output terminal Q of the first RS trigger TRG1 outputs a high level to control cut-off of the PMOS power tube Q1 and turn-on of the NMOS power tube Q2; when the first clock signal source 203 outputs a high level (that is, the second input terminal R of the first RS trigger TRG1 is set to 1) clock signal, no matter whether the first comparator COMP1 outputs a high level or low level, the first output terminal Q of the first RS trigger TRG1 outputs a low level to control turn-on of the PMOS power tube Q1 and cut-off of the NMOS power tube Q2. By using the first RS trigger TRG1 to control an on and off operation of the PMOS power tube Q1 and the NMOS power tube Q2 according to the fixed frequency (that is, the preset switching frequency), in combination with the energy storage inductor L1, the objective of voltage conversion of the direct current output by the direct current power supply 300 is achieved.

Second Embodiment

Figure 3:
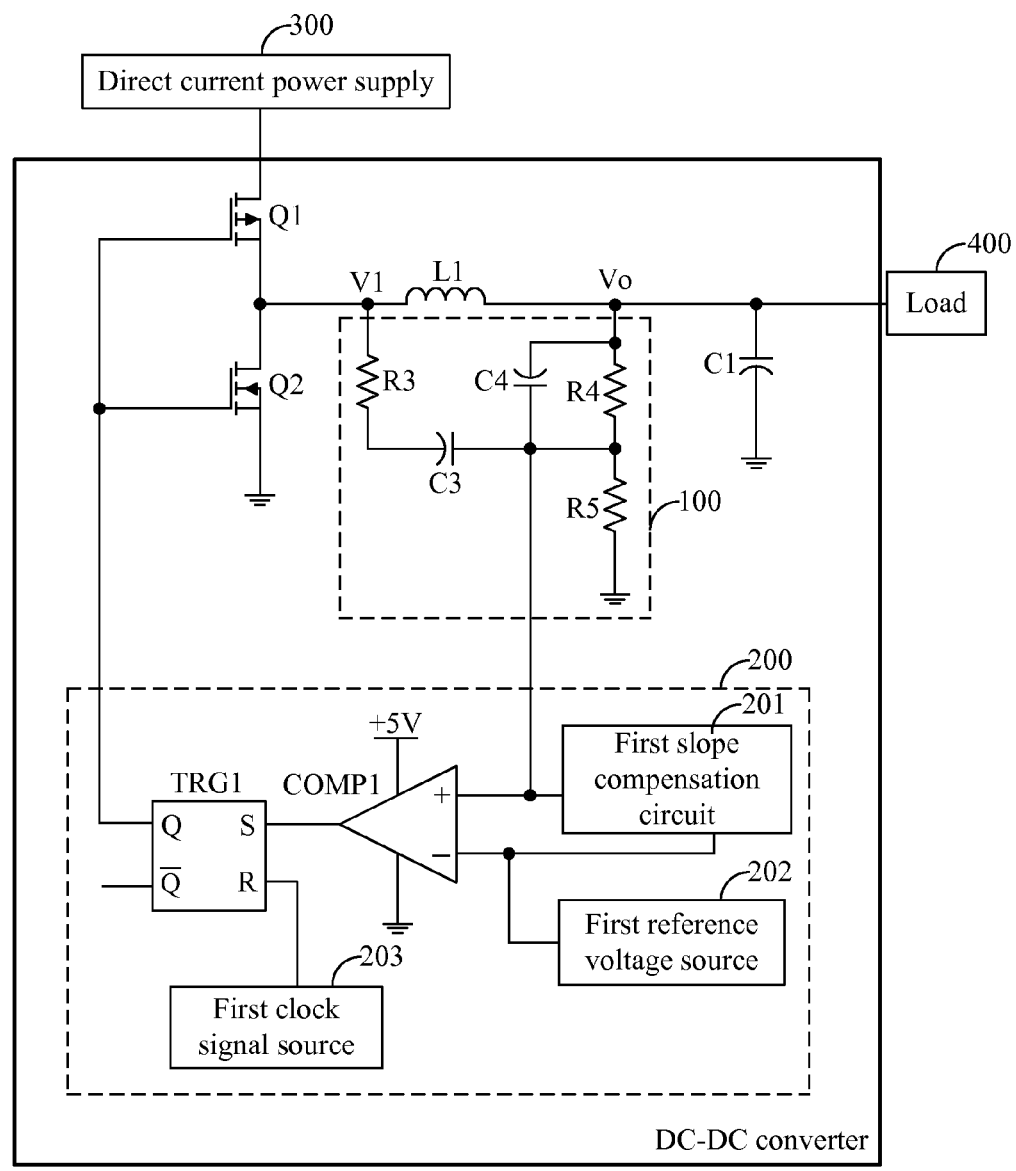
FIG. 3 shows an exemplary circuit structure of a DC-DC converter provided by a second embodiment of the present invention.

FIG. 3 shows an exemplary circuit structure of a DC-DC converter provided by the second embodiment of the present invention, and for ease of description, only the parts related to the second embodiment of the present invention are shown, and described below in detail:

As an embodiment of the present invention, a triangular wave generation module 100 includes:

a resistor R3, an energy storage capacitor C3, an energy storage capacitor C4, a resistor R4, and a resistor R5.

A first end of the resistor R3 is connected to a first input terminal of the triangular wave generation module 100, a second end of the resistor R3 is connected to a negative electrode of the energy storage capacitor C3, a positive electrode of the energy storage capacitor C3 is connected to an output terminal of the triangular wave generation module 100, a negative electrode of the energy storage capacitor C4 is connected to a first end of the resistor R4, the first end of the resistor R4 is connected to a second input terminal of the triangular wave generation module 100, a second end of the resistor R4, a positive electrode of the energy storage capacitor C4, and a first end of the resistor R5 are jointly connected to the positive electrode of the energy storage capacitor C3, and a second end of the resistor R5 is grounded.

The internal structure of a switch control module 200 in the DC-DC converter provided by the embodiment is the same as that provided by the first embodiment of the present invention, so details are no longer provided.

The DC-DC converter is further described with reference to its working principle:

When working, a triangular wave generation circuit formed of the resistor R3, the energy storage capacitor C3, the energy storage capacitor C4, the resistor R4, and the resistor R5 generates a triangular wave signal according to the voltage V1 of the first end and the voltage Vo of the second end of the energy storage inductor L1, and outputs the triangular wave signal to the first comparator COMP1 and the first slope compensation circuit 201; then the first slope compensation circuit 201 outputs a slope compensation signal according to its internally preset natural frequency and the triangular wave signal; the slope compensation signal is superposed with a reference voltage signal output by the first reference voltage source 202 and enters the inverting input terminal of the first comparator COMP1; and the first comparator COMP1 compares the voltage of its non-inverting input terminal with the voltage of its inverting input terminal, and outputs a level signal to the first input terminal S of the first RS trigger TRG1 accordingly. As can be seen from the foregoing description, it is known that, as the voltage of the non-inverting input terminal of the first comparator COMP1 changes with the triangular wave signal, the signals output by the first comparator COMP1 continuously are also pulse signals formed by a combination of high and low levels according to a duty ratio. According to the characteristics of the RS trigger, its logical truth table is as follows:

| R | S | $Q_n$ | $Q_{n+1}$ | $Q'_n$ | $Q'_{n+1}$ |
|---|---|---|---|---|---|
| 0 | 0 | 0 | 0 | 1 | 1 |
| 0 | 0 | 1 | 1 | 0 | 0 |
| 1 | 0 | 0 | 0 | 1 | 1 |
| 1 | 0 | 1 | 0 | 0 | 1 |
| 0 | 1 | 0 | 1 | 1 | 0 |
| 0 | 1 | 1 | 1 | 0 | 0 |
| 1 | 1 | 0 | — | 1 | — |
| 1 | 1 | 1 | — | 0 | — |

In the table, according to the characteristics of the RS trigger, the first input terminal S and the second input terminal R of the first RS trigger TRG1 cannot be set to 1 at the same time; otherwise, output uncertainties of the first RS trigger TRG1 occur. The slope compensation signal determines the signal frequencies of the non-inverting input terminal and the inverting input terminal of the first comparator COMP1, and therefore determines the output frequency of the first comparator COMP1. Therefore, in the embodiment of the present invention, in order that the first clock signal source 203 and the first comparator COMP1 do not simultaneously output high levels within the same pulse width time, the frequency of the clock signal output by the first clock signal source 203 is different from that of the slope compensation signal. When the first comparator COMP1 outputs a high level (that is, the first input terminal S of the first RS trigger TRG1 is set to 1), no matter whether the first clock signal source 203 outputs a high level or low level clock signal (that is, a setting signal of the second input terminal R of the first RS trigger TRG1), the first output terminal Q of the first RS trigger TRG1 outputs a high level to control cut-off of the PMOS power tube Q1 and turn-on of the NMOS power tube Q2; when the first clock signal source 203 outputs a high level (that is, the second input terminal R of the first RS trigger TRG1 is set to 1) clock signal, no matter whether the first comparator COMP1 outputs a high level or low level, the first output terminal Q of the first RS trigger TRG1 outputs a low level to control turn-on of the PMOS power tube Q1 and cut-off of the NMOS power tube Q2. By using the first RS trigger TRG1 to control an on and off operation of the PMOS power tube Q1 and the NMOS power tube Q2 according to the fixed frequency (that is, the preset switching frequency), in combination with the energy storage inductor L1, the objective of voltage conversion of the direct current output by the direct current power supply 300 is achieved.

Third Embodiment

Figure 4:
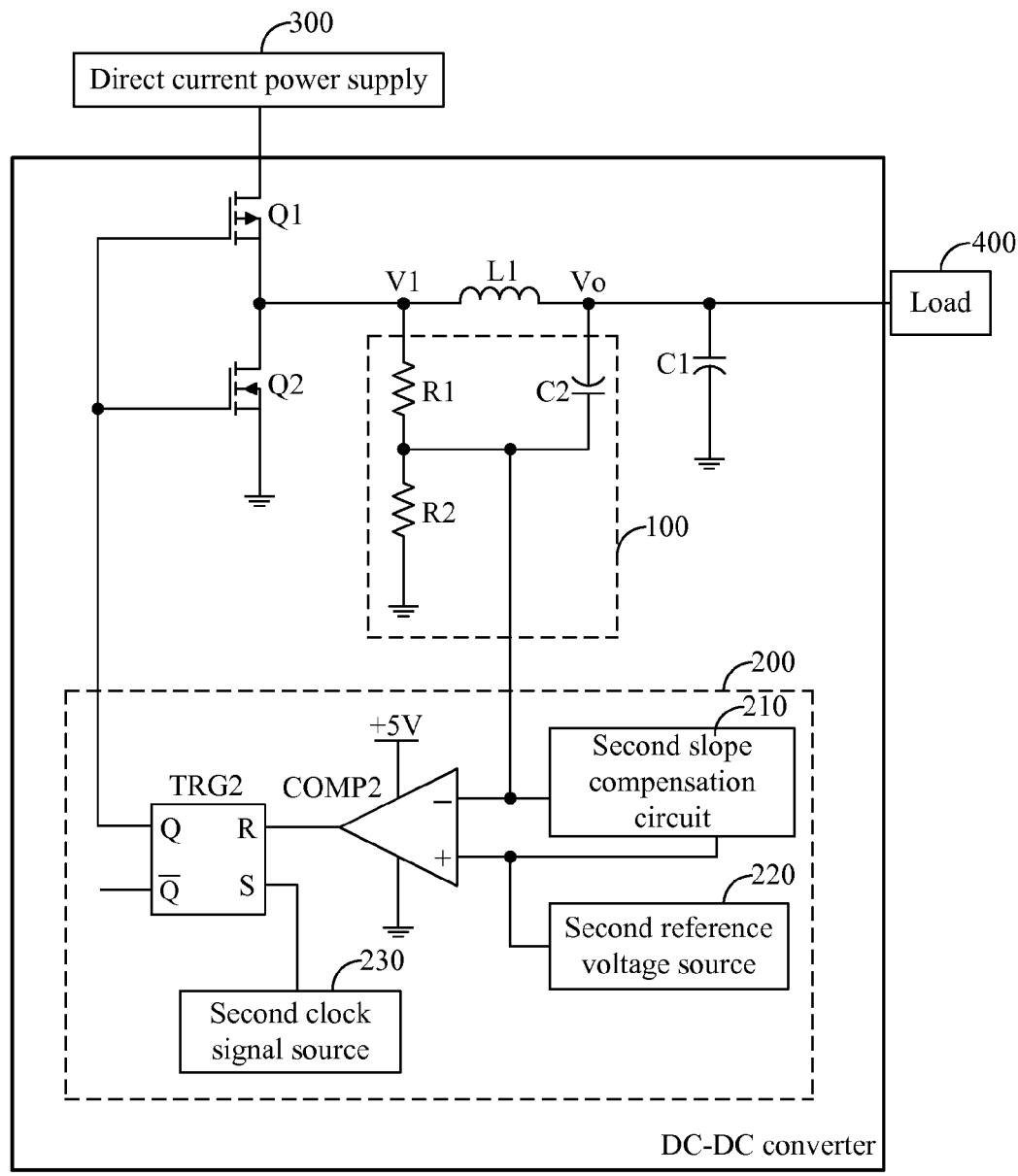
FIG. 4 shows an exemplary circuit structure of a DC-DC converter provided by a third embodiment of the present invention.

FIG. 4 shows an exemplary circuit structure of a DC-DC converter provided by the third embodiment of the present invention, and for ease of description, only the parts related to the third embodiment of the present invention are shown, and described below in detail:

The internal structure of a triangular wave generation module 100 in the DC-DC converter provided by the embodiment is the same as that provided by the first embodiment of the present invention, so details are no longer provided.

As an embodiment of the present invention, a switch control module 200 includes:

a second comparator COMP2, a second RS trigger TRG2, a second slope compensation circuit 210, a second reference voltage source 220, and a second clock signal source 230.

An inverting input terminal of the second comparator COMP2 is connected to an input terminal of the switch control module 200, a positive power supply terminal and a negative power supply terminal of the second comparator COMP2 are connected to a +5 V direct current power supply and grounded, respectively, an input terminal of the second slope compensation circuit 210 is connected to the inverting input terminal of the second comparator COMP2, an output terminal of the second slope compensation circuit 210 and an output terminal of the second reference voltage source 220 are jointly connected to a non-inverting input terminal of the second comparator COMP2, a first input terminal S and a second input terminal R of the second RS trigger TRG2 are connected to an output terminal of the second clock signal source 230 and an output terminal of the second comparator COMP2, respectively, a first output terminal Q of the second RS trigger TRG2 is connected to an output terminal of the switch control module 200, and a second output terminal $\overline{Q}$ of the second RS trigger TRG2 is floating. The second slope compensation circuit 210 is a common slope compensation signal generation circuit, and the slope value of a slope compensation signal generated by the second slope compensation circuit 210 changes with that of a falling edge of a triangular wave signal generated by the triangular wave generation module 100; the second reference voltage source 220 is a common reference voltage generation circuit, and is configured to output a reference voltage signal with a fixed voltage value; and the second clock signal source 230 is a common clock signal generation circuit, and is configured to output a clock signal with a fixed frequency. Herein, the second slope compensation circuit 210 is used to generate a slope compensation signal for overcoming the problem that the signal output of the second comparator COMP2 is affected by subharmonic oscillation, so as to improve the working stability of the second comparator COMP2, ensure accurate on and off control of the PMOS power tube Q1 and the NMOS power tube Q2 by the second RS trigger TRG2.

The DC-DC converter is further described with reference to its working principle:

When working, the resistor R1 and the resistor R2 divide the voltage of the first end of the energy storage inductor L1, and then output the voltage to the positive electrode of the energy storage capacitor C2, while the negative electrode of the energy storage capacitor C2 also obtains a voltage from the second end of the energy storage inductor L1; a triangular wave generation circuit formed of the resistor R1, the resistor R2, and the energy storage capacitor C2 generates a triangular wave signal according to the voltage V1 of the first end and the voltage Vo of the second end of the energy storage inductor L1, and outputs the triangular wave signal to the second comparator COMP2 and the second slope compensation circuit 210; then the second slope compensation circuit 210 outputs a slope compensation signal according to its internally preset natural frequency and the triangular wave signal; the slope compensation signal is superposed with a reference voltage signal output by the second reference voltage source 220 and enters the non-inverting input terminal of the second comparator COMP2; then the second comparator COMP2 compares the voltage of its non-inverting input terminal with the voltage of its inverting input terminal, and outputs a level signal to the second input terminal R of the second RS trigger TRG2 accordingly. As can be seen from the foregoing description, it is known that, as the voltage of the inverting input terminal of the second comparator COMP2 changes with the triangular wave signal, the signals output by the second comparator COMP2 continuously are also pulse signals formed by a combination of high and low levels according to a duty ratio. According to the characteristics of the RS trigger, its logical truth table is as follows:

| R | S | $Q_n$ | $Q_{n+1}$ | $Q'_n$ | $Q'_{n+1}$ |
|---|---|---|---|---|---|
| 0 | 0 | 0 | 0 | 1 | 1 |
| 0 | 0 | 1 | 1 | 0 | 0 |
| 1 | 0 | 0 | 0 | 1 | 1 |
| 1 | 0 | 1 | 0 | 0 | 1 |
| 0 | 1 | 0 | 1 | 1 | 0 |
| 0 | 1 | 1 | 1 | 0 | 0 |
| 1 | 1 | 0 | — | 1 | — |
| 1 | 1 | 1 | — | 0 | — |

In the table, according to the characteristics of the RS trigger, the first input terminal S and the second input terminal R of the second RS trigger TRG2 cannot be set to 1 at the same time; otherwise, output uncertainties of the second RS trigger TRG2 occur. The slope compensation signal determines the signal frequencies of the non-inverting input terminal and the inverting input terminal of the second comparator COMP2, and therefore determines the output frequency of the second comparator COMP2. Therefore, in the embodiment of the present invention, in order that the second clock signal source 230 and the second comparator COMP2 do not simultaneously output high levels within the same pulse width time, the frequency of the clock signal output by the second clock signal source 230 is different from that of the slope compensation signal. When the second comparator COMP2 outputs a high level (that is, the second input terminal R of the second RS trigger TRG2 is set to 1), no matter whether the second clock signal source 230 outputs a high level or low level clock signal (that is, a setting signal of the first input terminal S of the second RS trigger TRG2), the first output terminal Q of the second RS trigger TRG2 outputs a low level to control turn-on of the PMOS power tube Q1 and cut-off of the NMOS power tube Q2; and when the second clock signal source 230 outputs a high level (that is, the first input terminal S of the second RS trigger TRG2 is set to 1) clock signal, no matter whether the second comparator COMP2 outputs a high level or low level, the first output terminal Q of the second RS trigger TRG2 outputs a high level to control cut-off of the PMOS power tube Q1 and turn-on of the NMOS power tube Q2. By using the second RS trigger TRG2 to control an on and off operation of the PMOS power tube Q1 and the NMOS power tube Q2 according to the fixed frequency (that is, the preset switching frequency), in combination with the energy storage inductor L1, the objective of voltage conversion of the direct current output by the direct current power supply 300 is achieved.

Fourth Embodiment

Figure 5:
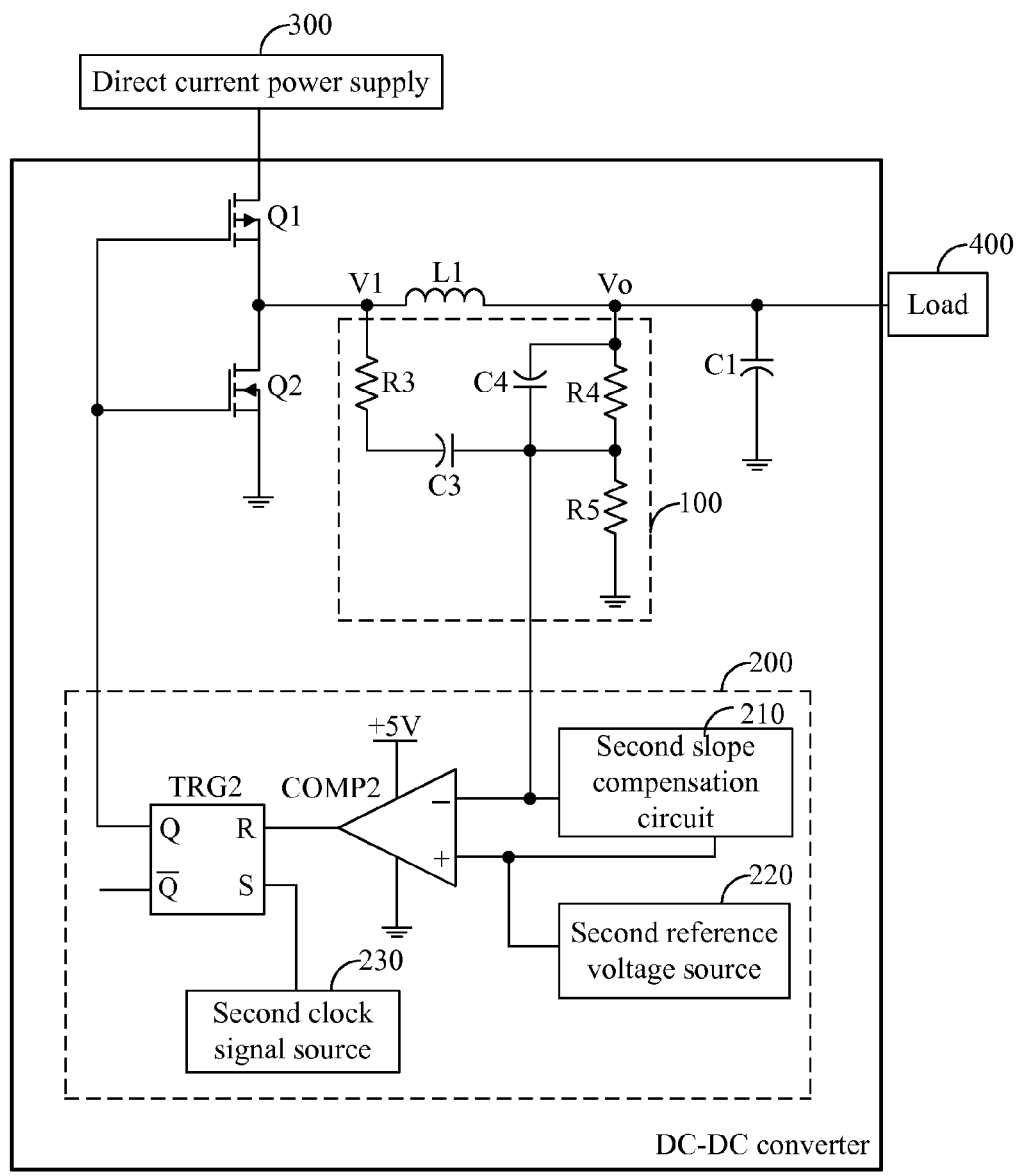
FIG. 5 shows an exemplary circuit structure of a DC-DC converter provided by a fourth embodiment of the present invention.

FIG. 5 shows an exemplary circuit structure of a DC-DC converter provided by the fourth embodiment of the present invention, and for ease of description, only the parts related to the fourth embodiment of the present invention are shown, and described below in detail:

The internal structure of a triangular wave generation module 100 in the DC-DC converter provided by the embodiment is the same as that provided by the second embodiment of the present invention, and the internal structure of a switch control module 200 in the embodiment is consistent with that provided by the third embodiment of the present invention, so details are no longer provided.

The DC-DC converter is further described with reference to its working principle:

When working, a triangular wave generation circuit formed of a resistor R3, an energy storage capacitor C3, an energy storage capacitor C4, a resistor R4, and a resistor R5 generates a triangular wave signal according to the voltage LX of the first end and the voltage Vo of the second end of the energy storage inductor L1, and outputs the triangular wave signal to the second comparator COMP2 and the second slope compensation circuit 210; then the second slope compensation circuit 210 outputs a slope compensation signal according to its internally preset natural frequency and the triangular wave signal; the slope compensation signal is superposed with a reference voltage signal output by the second reference voltage source 220 and enters the non-inverting input terminal of the second comparator COMP2; then the second comparator COMP2 compares the voltage of its non-inverting input terminal with the voltage of its inverting input terminal and outputs a level signal to the second input terminal R of the second RS trigger TRG2 accordingly. As can be seen from the foregoing description, it is known that, as the voltage of the inverting input terminal of the second comparator COMP2 changes with the triangular wave signal, the signals output by the second comparator COMP2 continuously are also pulse signals formed by a combination of high and low levels according to a duty ratio. According to the characteristics of the RS trigger, its logical truth table is as follows:

| R | S | $Q_n$ | $Q_{n+1}$ | $Q'_n$ | $Q'_{n+1}$ |
|---|---|---|---|---|---|
| 0 | 0 | 0 | 0 | 1 | 1 |
| 0 | 0 | 1 | 1 | 0 | 0 |
| 1 | 0 | 0 | 0 | 1 | 1 |
| 1 | 0 | 1 | 0 | 0 | 1 |
| 0 | 1 | 0 | 1 | 1 | 0 |
| 0 | 1 | 1 | 1 | 0 | 0 |
| 1 | 1 | 0 | — | 1 | — |
| 1 | 1 | 1 | — | 0 | — |

In the table, according to the characteristics of the RS trigger, the first input terminal S and the second input terminal R of the second RS trigger TRG2 cannot be set to 1 at the same time; otherwise, output uncertainties of the second RS trigger TRG2 occur. The slope compensation signal determines the signal frequencies of the non-inverting input terminal and the inverting input terminal of the second comparator COMP2, and therefore determines the output frequency of the second comparator COMP2. Therefore, in the embodiment of the present invention, in order that the second clock signal source 230 and the second comparator COMP2 do not simultaneously output high levels within the same pulse width time, the frequency of the clock signal output by the second clock signal source 230 is different from that of the slope compensation signal. When the second comparator COMP2 outputs a high level (that is, the second input terminal R of the second RS trigger TRG2 is set to 1), no matter whether the second clock signal source 230 outputs a high level or low level clock signal (that is, a setting signal of the first input terminal S of the second RS trigger TRG2), the first output terminal Q of the second RS trigger TRG2 outputs a low level to control turn-on of the PMOS power tube Q1 and cut-off of the NMOS power tube Q2; and when the second clock signal source 230 outputs a high level (that is, the first input terminal S of the second RS trigger TRG2 is set to 1) clock signal, no matter whether the second comparator COMP2 outputs a high level or low level, the first output terminal Q of the second RS trigger TRG2 outputs a high level to control cut-off of the PMOS power tube Q1 and turn-on of the NMOS power tube Q2. By using the second RS trigger TRG2 to control an on and off operation of the PMOS power tube Q1 and the NMOS power tube Q2 according to the fixed frequency (that is, the preset switching frequency), in combination with the energy storage inductor L1, the objective of voltage conversion of the direct current output by the direct current power supply 300 is achieved.

In the embodiment of the present invention, a DC-DC converter including a triangular wave generation module 100 and a switch control module 200 is adopted. The triangular wave generation module 100 generates a triangular wave signal according to voltages at both ends of the energy storage inductor L1, and the switch control module 200 outputs a control level according to its internally generated clock signal and the triangular wave signal to control a switching operation of a PMOS power tube Q1 and an NMOS power tube Q2 according to a fixed switching frequency, so as to implement preset switching frequency control of the PMOS power tube Q1 and the NMOS power tube Q2, simplify the circuit structure of the DC-DC converter while ensuring voltage conversion of a direct current, improve anti-noise capability, reduce an occupied packaging area of the DC-DC converter in an integrated design of a chip, and further reduce the cost of a chip, thereby solving the problem that an existing DC-DC converter can implement fixed switching frequency control of a power tube, but has undesirable anti-noise capability caused by a complex circuit structure, and has an excessively large occupied packaging area in a chip and increased cost in circuit integration.

The foregoing descriptions are merely exemplary embodiments of the present invention, but are not intended to limit the present invention. Any modifications, equivalent substitutions, and improvements made within the spirit and principle of the present invention shall fall within the protection scope of the present invention.

What is claimed is:

1. A DC-DC converter, connected to a direct current power supply, and comprising a PMOS power tube, an NMOS power tube, an energy storage inductor L1, and a filter capacitor C1, wherein the PMOS power tube and the NMOS power tube perform a switching operation respectively according to a frequency of an input signal on a respective gate to perform voltage conversion on a direct current output by the direct current power supply, and the energy storage inductor L1 and the filter capacitor C1 perform voltage stabilization and filter processing on the direct current after the voltage conversion performed by the PMOS power tube and the NMOS power tube, and output the direct current on which the voltage stabilization and the filter processing have been performed, and the DC-DC converter further comprises:
  a triangular wave generation module, comprising a first input terminal and a second input terminal connected to a first end and a second end of the energy storage inductor L1, respectively, and configured to generate a triangular wave signal according to voltages at both ends of the energy storage inductor L1; and
  a switch control module, comprising an input terminal connected to an output terminal of the triangular wave generation module and an output terminal connected to both the gate of the PMOS power tube and the gate of the NMOS power tube, and configured to output a control level according to the triangular wave signal to control a switching operation of the PMOS power tube and the NMOS power tube according to a preset switching frequency, wherein the switch control module comprises a slope compensation circuit that generates a slope compensation signal based on the triangular wave signal generated by the triangular wave generation module, wherein a slope value of the slope compensation signal changes with that of a falling edge of the triangular wave signal generated by the triangular wave generation module.

2. The DC-DC converter according to claim 1, wherein the triangular wave generation module comprises a resistor R1, a resistor R2, and an energy storage capacitor C2, wherein a first end of the resistor R1 is connected to the first input terminal of the triangular wave generation module, a second end of the resistor R1 and a first end of the resistor R2 are jointly connected to a positive electrode of the energy storage capacitor C2, a second end of the resistor R2 is grounded, and the positive electrode and a negative electrode of the energy storage capacitor C2 are connected to the output terminal and the second input terminal of the triangular wave generation module, respectively.

3. The DC-DC converter according to claim 1, wherein the switch control module further comprises: a first comparator, a first Reset-Set (RS) trigger, a first reference voltage source, and a first clock signal source, wherein the slope compensation circuit comprises a first slope compensation circuit and wherein:
  a non-inverting input terminal of the first comparator is connected to the input terminal of the switch control module,
  a positive power supply terminal and a negative power supply terminal of the first comparator are connected to a +5 V direct current power supply and grounded, respectively,
  an input terminal of the first slope compensation circuit is connected to the non-inverting input terminal of the first comparator,
  an output terminal of the first slope compensation circuit and an output terminal of the first reference voltage source are jointly connected to an inverting input terminal of the first comparator,
  a first input terminal and a second input terminal of the first RS trigger are connected to an output terminal of the first comparator and an output terminal of the first clock signal source, respectively,
  a first output terminal of the first RS trigger is connected to the output terminal of the switch control module, and
  a second output terminal of the first RS trigger is floating.

4. The DC-DC converter according to claim 1, wherein the triangular wave generation module comprises:
  a resistor R3, an energy storage capacitor C3, an energy storage capacitor C4, a resistor R4, and a resistor R5, wherein:
  a first end of the resistor R3 is connected to the first input terminal of the triangular wave generation module, a second end of the resistor R3 is connected to a negative electrode of the energy storage capacitor C3, a positive electrode of the energy storage capacitor C3 is connected to the output terminal of the triangular wave generation module, a negative electrode of the energy storage capacitor C4 is connected to a first end of the resistor R4, the first end of the resistor R4 is connected to the second input terminal of the triangular wave generation module, a second end of the resistor R4, a positive electrode of the energy storage capacitor C4, and a first end of the resistor R5 are jointly connected to the positive electrode of the energy storage capacitor C3, and a second end of the resistor R5 is grounded.

5. The DC-DC converter according to claim 1, wherein the switch control module comprises: a second comparator, a second Reset-Set (RS) trigger, a second reference voltage source, and a second clock signal source, wherein the slope compensation circuit comprises a second slope compensation circuit and wherein:

> an inverting input terminal of the second comparator is connected to the input terminal of the switch control module,
>
> a positive power supply terminal and a negative power supply terminal of the second comparator are connected to a +5 V direct current power supply and grounded, respectively,
>
> an input terminal of the second slope compensation circuit is connected to the inverting input terminal of the second comparator,
>
> an output terminal of the second slope compensation circuit and an output terminal of the second reference voltage source are jointly connected to a non-inverting input terminal of the second comparator,
>
> a first input terminal and a second input terminal of the second RS trigger are connected to an output terminal of the second clock signal source and an output terminal of the second comparator, respectively,
>
> a first output terminal of the second RS trigger is connected to the output terminal of the switch control module, and
>
> a second output terminal of the second RS trigger is floating.

* * * * *